United States Patent
Gatti (10) Patent No.: US 7,616,969 B2
(45) Date of Patent: Nov. 10, 2009

(54) METHODS AND APPARATUS FOR DIAL STRING TO CONTACT MATCHING IN A WIRELESS COMMUNICATION DEVICE

(75) Inventor: John Michael Gatti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 11/615,320

(22) Filed: Dec. 22, 2006

(65) Prior Publication Data

US 2008/0153412 A1    Jun. 26, 2008

(51) Int. Cl.
*H04M 1/00* (2006.01)
(52) U.S. Cl. .................... 455/550.1; 455/564; 455/566; 455/414.1; 455/415
(58) Field of Classification Search .............. 455/550.1, 455/3.01, 415, 425, 457, 564, 566, 460, 461, 455/9, 432.2, 423, 414.1, 412.1, 565, 567
See application file for complete search history.

(56) References Cited

U.S. PATENT DOCUMENTS 5,708,804 A * 1/1998 Goodwin et al. ............... 707/3
2002/0187815 A1* 12/2002 Deeds et al. ................. 455/564
2004/0018857 A1* 1/2004 Asokan et al. .............. 455/564

FOREIGN PATENT DOCUMENTS

| EP | 1791066    | 5/2007  |
|----|------------|---------|
| WO | 2005096603 | 10/2005 |

OTHER PUBLICATIONS

International Search Report—PCT/US07/088296, International Search Authority—European Patent Office—Jun. 5, 2008.
Written Opinion- PCT/US07/088296, International Search Authority—European Patent Office—Jun. 5, 2008.

* cited by examiner

*Primary Examiner*—Tan Trinh
(74) *Attorney, Agent, or Firm*—Darren M. Simon (57) ABSTRACT

Methods, devices, computer program products and systems for contact matching that is based on changing the dial string to include or delete codes. The described aspects provide for contact matching and subsequent display of contact information to occur in most instances in- which a connection occurs and for no matching and no subsequent display of contact information to occur in most instances in which a connection does not occur. The described aspects, systems and apparatus overcome problems related to an exact match scheme, which fails to provide contact information in many instances in which a call connection occurs, and a last, seven, or any other number, digit match scheme, which may provide contact information in instances in which a call connection cannot he made or is made to an unintended device.

42 Claims, 6 Drawing Sheets

METHODS AND APPARATUS FOR DIAL STRING TO CONTACT MATCHING IN A WIRELESS COMMUNICATION DEVICE

BACKGROUND

1. Field

The disclosed aspects relate to wireless communication devices, and more particularly, to systems, methods and apparatus that provide for an inputted dial string or received caller identification to be properly matched to existing contact information stored in a wireless communication device.

2. Background

Wireless communication devices, such as wireless telephones are generally configured to provide for the storage of contact information. Contact information includes, but is not limited to, names of contacts; telephone number(s) of the contacts; home, business and/or email addresses associated with the contact; and the like. Stored contact information may be used to place a call or the information may be displayed in conjunction with the dialing of a contact telephone number or the receipt of a call from a contact. For example, a wireless communication device user may access the contact application and select a contact for calling purposes. By selecting a chosen contact listing, a telephone number associated with the contact is dialed and an attempt to place the call is made. Additionally, a user may dial a telephone number and if the number is associated with a contact, the wireless communication device will display contact information, such as a name, telephone number or the like. In terms of a received call, the contact information serves as the caller identification mechanism; if the received dial string matches a number in the contact listings, information associated with the contact/caller, such as name, telephone number and the like, is displayed.

Wireless communication device users may associate whatever telephone number they desire with a contact. For example, a user may associate a 10 digit number that includes the area code and local telephone number, a seven digit number that is limited, to the local telephone number or more lengthy numbers that include country codes, city codes, regional codes, network codes and the like.

A problem exists in assuring that contact information is matched and subsequently displayed when a dialed destination telephone number is connected and assuring that contact information is not matched and subsequently displayed when a dialed destination number is not connected. Destination telephone numbers are not always unique; oftentimes more than one number can successfully connect to a targeted telephone number. For example, within the United States it may or may not be necessary to dial the area code when originating a call, if the number that is being called shares the same area code as the number originating the call. In the instance in which it is not necessary to dial the area code, the call will successfully connect with or without the area code being part of the dial string. However, depending on the method used to match contact information to inputted dial strings, the contact information may or may not be displayed.

For example, in some wireless communication devices contact information is only provided if an exact match exists between the inputted or received dial string and the number stored in the contact listing. This method results in many instances in which the call is placed to a contact or a call received from a contact and the contact information is not displayed or otherwise communicated by the device. In one situation, assuming the dialing device and the contact reside in the same area code, if the dialing device stores the contact telephone number as a ten digit number (i.e., the three digit area code+seven digit telephone number) but the number dialed is the seven digit telephone number, the call will be connected, however no contact information is displayed because an exact match did not occur. In the same regard, assuming the dialing device and the contact reside in the same area code, if the dialing device stores the contact telephone number as a seven digit number but the number dialed is the ten digit area code and telephone number, the call will be connected, however no contact information is displayed because an exact match, did not occur. From the received call perspective, in the United States the device receiving a call always receives a ten digit dial string because the network will attach the area code to the dial string regardless of whether the device that placed the call inputted a seven digit or ten digit number. Thus, in the exact match scenario, if the device receiving the call stores a seven-digit number for the contact, the call will be received, however, no contact information will be displayed because an exact match did not occur.

In other wireless devices contact information is provided if a match exists between the last specified number of digits of the inputted or received dial string and the number stored in the contact listing. For example, in the United States the match may be based on the last seven digits of the stored contact listing because in the United States the telephone number is typically seven digits. In other locales, matching may be based on less or more than seven digits, depending on the number of digits in the telephone for a given locale. However, this method may result in instances in which a dialed call cannot be connected or is connected to an unintended device yet contact information is displayed. For example, in a United States application, assuming that the dialing device and the contact reside in different area codes, if the dialing device stores the contact telephone number as a ten digit number but the number dialed is a seven digit number, the call will not be connected, however the contact information will be displayed because the last seven digits of the stored contact number match the number that is dialed. In this instance, the user confronted, with contact information assumes that the call is being connected to their intended recipient when in fact the call is either not connected or is connected to an unintended device residing in the area code of the dialing device. Additionally, contact matching based on the last specified number of digits of the dialed or received dial string may pose other unique problems. For example, in another United States application, the user may store two contacts that have the same seven-digit number but differ in area code. In this instance the last seven digit matching scheme is prone to display the contact information of whichever contact first provides the seven-digit match; regardless of the actual number dialed or received. In another United States example, a user may dial a non-contact number that matches the same last seven digits of a stored contact. In this instance, the stored contact information is displayed even though it has no relevancy to the number that is being dialed.

Therefore, a need exists for a robust contact-matching scheme that provides for matching and subsequent display of contact information to occur in most instances in which a connection occurs and for no matching and subsequent display of contact information to occur in most instances in which a connection does not occur. In this regard the desired methods, systems and apparatus shall overcome problems related to an exact match scheme, which fails to provide contact information in many instances in which a call connection occurs, and a last seven digit match scheme, which may provide contact information in instances in which a call connection cannot be made or is made to an unintended device.

SUMMARY

The disclosed apparatus and methods provide for improved dial string to contact matching for initiated and received wireless communication calls.

In particular, devices, methods, apparatus, computer-readable media and processors are presented for a robust contact matching scheme that provides for matching and subsequent display of contact information to occur in most instances in which a connection occurs and for no matching and subsequent display of contact information to occur in most instances in which a connection does not occur. In this regard the described aspects, systems and apparatus overcome problems related to an exact match scheme, which fails to provide contact information in many instances in which a call connection occurs, and a last seven digit match scheme, which may provide contact information in instances in which a call connection cannot be made or is made to an unintended device.

The described aspects provide for attempting to match the dial string to a stored contact and, if no match occurs, changing the length of a dial string on a call being placed (i.e., a wireless originating call) or changing the length of a dial string on a call being received (i.e., a wireless terminating call). Changing the length of a dial string may involve adding or deleting, from the dial string, a code, such as an area code, country code, region code, city code, network code or the like. Once the dial string length has been changed, an attempt is made to match the changed dial string to a stored contact. In some aspects, the adding and deleting of codes to the dial string is an iterative process, whereby codes may be added or deleted until a contact match is found. In one aspect, codes are iteratively added, and if no match is found, then the process involves iteratively deleting codes from the dial string in an attempt to find a matching contact.

In one aspect, a method is provided for contact matching at a wireless communication device. The method includes receiving a dial string having a first length and associated with a wireless communication call, determining if the received dial string matches one of a plurality of stored contact numbers, changing the first length of the received dial string to a second length if the determination results in no match between the received dial string and the plurality of stored contact numbers and determining if the changed dial string matches one of the plurality of stored contact numbers. In some aspects receiving the dial string is further defined as receiving a dial string for initiating a wireless communication call. In other aspects receiving the dial string is further defined as receiving a dial string for connecting a wireless communication call. In some aspects, determining if the received or changed dial string matches one of the plurality of stored contact numbers may further involve an exact match to one of the stored contact numbers or a match of the last x-number of digits in the dial string to one of the stored contact numbers.

In those aspects in which receiving the dial string is further defined as receiving a dial string for initiating a wireless communication call, changing the first length of the dial string may involve adding to the dial string or deleting from the dial string a code that is associated with the wireless device. The associated code may be the wireless device's area code, country code, region code, city code, network code or the like. Adding a code to the dial string may involve prefixing a code to the front of the dial string, inserting a code within the dial string or appending a code to the end of the dial string. Deleting a code from the dial string may involve deleting a code from the prefix of the string, deleting a code from within the dial string or deleting a code from the appendix of the string. The code that is added to, or deleted from, the dialing string may be the first code in a dialing hierarchy that includes one or more codes. In which case, the method may include adding or deleting, iteratively, to the changed dial string, a next code in the dialing hierarchy if no match results between the changed dial string and the plurality of stored contact numbers.

In those aspects in which receiving the dial string is further defined as receiving a dial string for connecting a wireless communication call, changing the first length of the dial string may involve deleting from the dial string a code, such as an area code, country code, region code, city code, network code or the like. Deleting a code from the dial string may involve deleting a code from the prefix of the string, deleting a code from within the dial string or deleting a code from the appendix of the string. The code that is deleted from the dialing string may be the first code in a dialing hierarchy that includes one or more codes. In which case, the method may include deleting, iteratively, from the changed dial string, a next code in the dialing hierarchy if no match results between the changed dial string and the plurality of stored contact numbers.

A further aspect is defined by at least one processor. The processor is configured to perform the actions of receiving a dial string of a first length that is associated with a wireless communication call, determining if the received dial string matches one of a plurality of stored contact numbers, changing the first length of the received dial string to a second length if the determination results in no match between the received dial string and the plurality of stored contact numbers and determining if the changed dial string matches one of the plurality of stored contact numbers.

A related aspect is provided for in computer program product that includes a computer-readable medium. The computer-readable medium includes a first set of codes for causing a computer to receive a dial string having a first length and associated with a wireless communication call, a second set of codes for causing the computer to determine if the received dial string matches one of a plurality of stored contact numbers, a third set of codes for causing the computer to change the first length of the received dial string to a second length if the determination results in no match between the received dial string and the plurality of stored contact numbers and a fourth set of codes for causing the computer to determine if the changed dial string matches one of the plurality of stored contact numbers.

Yet another related, aspect is defined by a wireless communication device. The device includes means for receiving a dial string having a first length and associated with a wireless communication call, means for determining if the received dial string matches one of a plurality of stored contact numbers, means for changing the first length of the received dial string to a second length if the determination results in no match between the received dial string and the plurality of stored contact numbers and means for determining if the changed dial string matches one of the plurality of stored contact numbers.

A wireless communication device defines another aspect. The wireless communication device includes a computer platform that includes a processor, a memory and a communications module. The memory also comprises a plurality of contact numbers. The communications module is in communication with the processor and is operable for receiving a dial string of a first length, wherein the dial suing is associated with a wireless communication call. The device also includes a contact matching module stored in the memory, executable by the processor and operable for determining if the dial string matches one of the plurality of contact numbers, changing the first length of the dial string to a second length if the determination results in no match between the dial string and the plurality of contact numbers and determining if the changed dial string matches one of the plurality of contact numbers. The device communications module may further include a dialer module operable for receiving a dial string of a first length to initiate a wireless communication call receiving and/or a call-receiving module operable for receiving a dial string of a first length to connect a wireless communication call. In aspects in which the device includes a call receiving module the contact matching module is further operable for determining if the dial string matches one of the plurality of contact numbers, changing the first length of the dial string to a second length if the determination results in no match between the dial string and the plurality of contact numbers and determining if the changed dial string matches one of the plurality of contact numbers.

Thus, present aspects define a robust contact-matching scheme that provides for matching and subsequent display of contact information to occur in most instances in which a connection occurs and for no matching and subsequent display of contact information to occur in most instances in which a connection does not occur. In this regard the described aspects, systems and apparatus overcome problems related to an exact match scheme, which tails to provide contact information in many instances in which a call connection occurs, and a last seven or any other number digit match scheme, which may provide contact information in instances in which a call connection cannot be made or is made to an unintended device.

BRIEF DESCRIPTION OF THE DRAWINGS

The disclosed aspects will hereinafter be described in conjunction with, the appended drawings, provided to illustrate and not to limit the disclosed aspects, wherein like designations denote the elements, and in which.

DETAILED DESCRIPTION

The present devices, apparatus, methods, computer-readable media and processors now will he described more fully hereinafter with reference to the accompanying drawings, in which aspects of the invention ate shown. The devices, apparatus, methods, computer-readable media and processors, however, may be embodied in many different forms and should not be construed as limited to the aspects set forth herein; rather, these aspects are provided so that this disclosure will he thorough and complete, and will fully convey the scope of the invention to those skilled in the art. Like numbers refer to like elements throughout.

The various aspects for dial string to contact matching are described herein in connection with a wireless communication device. A wireless communication device can also be called a subscriber station, a subscriber unit, mobile station, mobile, remote station, access point, remote terminal, access terminal, user terminal, user agent, a user device, or user equipment. A wireless communication device may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

The described aspects provide for methods, apparatus and systems for dial string to contact matching in a wireless communication device. The methods, systems and devices provide contact matching of dial strings that are received for initiating a call at a call originating wireless device and dial strings that are received for connecting a call at a call terminating wireless device. As will be described in detail below, the aspects provide for the dial string length to be iteratively changed, such as by adding or deleting codes, if a match does not exist between the dial string and stored contact numbers. Thus, the described aspects provide for contact matching in most instances in which a call is successfully connected or placed, and also provide for no matching in most instances in which a call is hot connected or placed.

Figure 1:
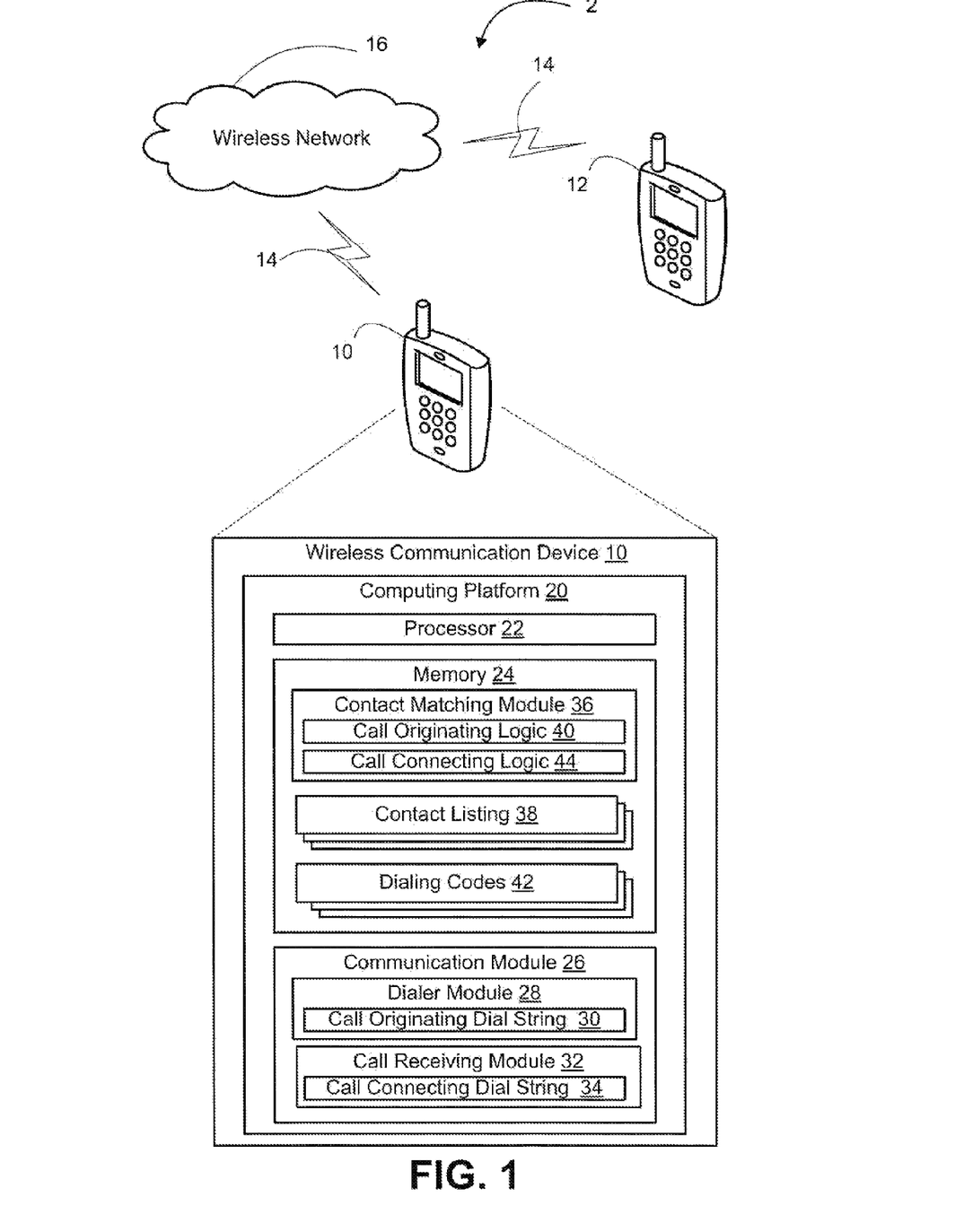
FIG. 1 is a block diagram of a system for providing dial string to contact matching at a wireless communication device, in accordance with an aspect.

Referring to FIG. 1, a schematic representation of a system 2 for dial string to contact matching in wireless communication devices is presented. The dial string to contact matching system 2 may include first wireless communication device 10 and second wireless communication device 12. The first and second wireless communication devices 10 and 12 may be in wireless communication 14, via wireless network 16. In the illustrated embodiment of FIG. 1, the block diagram depicts hardware, apparatus, modules and/or logic for providing dial string to contact matching in first wireless communication device 10. For example, in the instance in which the first wireless communication device 10 is the device that is placing or originating the call, contact matching, per the described aspects, may occur between the dial string that is inputted/received at the first wireless communication device and stored contact numbers. Additionally, in the instance in which the first wireless communication device is receiving a call, contact matching, per the described aspects, may occur between the dial string that is received from wireless network 16 and stored contact numbers. It should be noted that second wireless communication device 12 will typically include similar hardware, apparatus, modules and/or logic to allow for dial string to contact matching in the instances in which the second wireless communication device 12 originates/places a wireless call or receives a wireless call.

The first wireless communication device 10 includes a computing platform 20 having a processor 22, a memory 24 and a communications module 26. Communications module 26 is operable to receive a dial string associated with either initiating/originating a communication call or connecting/terminating a communication call. Communication Module 26 may Include a dialer module 28 operable for receiving a call originating dial, string 30 for initiating/originating a wireless communication. Additionally, communication module 26 may include a call-receiving module 32 operable for receiving a call connecting dial string 34 from wireless network 16 for connecting/terminating the communication call.

Memory 24 includes a contact-matching module 36 operable for attempting to match call originating dial string 30 and/or call connecting dial string 34 to one of a plurality of stored contact listings 38. Contact listings 38 may include a contact name, a number associated with the contact and any other information associated with the contact. A match between dial string 30 or 34 and one of the plurality of contact listings 38 may result in the visual display or audio communication, of information related to the contact, such as the contact name, contact number and the like in conjunction with the placement of the call or the receipt of the call from network 16. Additionally, while the contact listings 38 are depicted as stored locally on wireless communication device 10, in alternate aspects the contacts may be stored remotely at a network device, which is accessed by wireless communication device 10 to search or retrieve contact information as needed.

The contact-matching module 36 may include call originating logic 40 operable for attempting to match the call-originating dial string 30 to one of the plurality of contact listings 38. In one aspect, the attempt to match the call originating dial string 30 to one of the plurality of contact listings 38 may include determining if the call originating dial string matches one of the plurality of contact listings 38 and, if no match is determined, changing the length, of the dial string by adding or deleting a dialing code 42 associated with wireless communication device 10. An attempt is then made to match the changed dial string to one of the plurality of contact listings 38. The process of changing the dial string length, by adding or deleting dialing codes 42, may continue iteratively until a contact match is determined or until all dialing codes 42 associated with wireless communication device 10 have been added or deleted from the dial string and no resulting contact match is determined. In many aspects adding or deleting a code occurs at the beginning of the dial string, however, it is also conceivable and within the inventive concepts herein disclosed to add or delete the code from within the dial string (i.e., insert) or at the end of the dial string (i.e., append). The dialing codes 42 may include, but are not limited to, an area code, a country code, a region code, a city code, a network code or the like.

The contact-matching module 36 may include call connecting logic 44 operable for attempting to match the call-connecting dial string 34 to one of the plurality of contact listings 36. In one aspect, the attempt to match the call connecting dial string 34 to one of the plurality of contact listings 36 may include determining if the call originating dial string matches one of the plurality of contact listings 36 and, if no match is determined, changing the length of the dial string by deleting any code found in the dial string. An attempt is then made to match the changed dial string to one of the plurality of contact listings 36. The process of changing the dial string length, by deleting a code, may continue iteratively until a contact match is determined or until all the codes occurring in call-connecting dial string 34 have been deleted from the dial string and no resulting contact match is determined. The codes occurring within call connecting dial string 34 may include, but are not limited to, an area code, a country code, a region code, a city code, a network code or the like.

Figure 2:
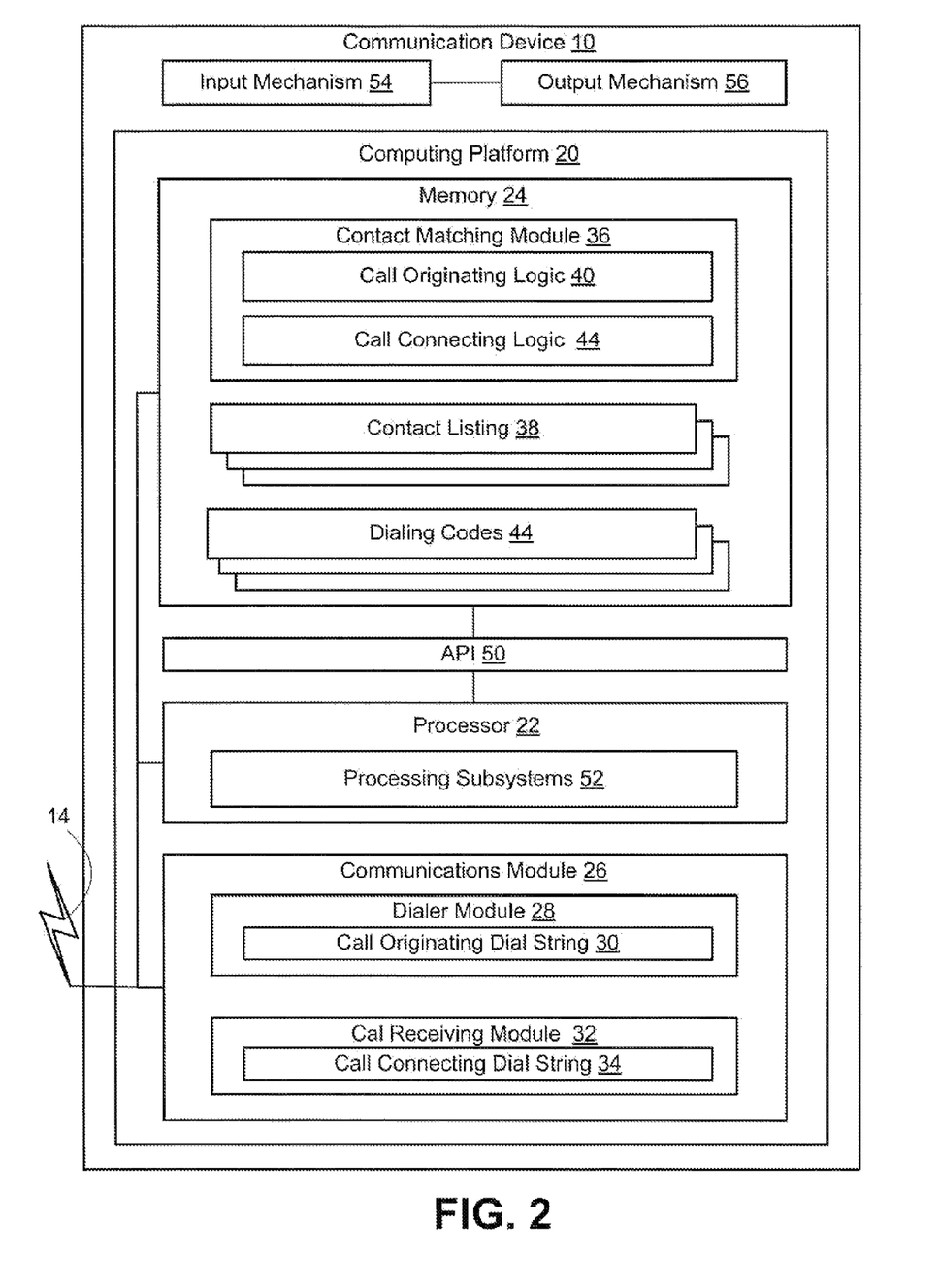
FIG. 2 is block diagram of a wireless device for providing dial string to contact matching, in accordance with an aspect.

Referring to FIG. 2, according to one aspect, a detailed block diagram representation of wireless communication device 10 operable for performing dial string to contact matching is depicted. Wireless communication devices may include any type of computerized, communication device* such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module capable of making wireless communication calls, including a wireless communication portal, including without limitation, wireless modems, PCMCIA cards, access terminals, desktop computers or any combination or sub-combination thereof.

The wireless communication device 10 includes computer platform 20 that can transmit data across a wireless network, and that can receive and execute routines and applications. Computer platform 20 includes memory 24, which may comprise volatile and nonvolatile memory such as read-only and/or random-access memory (RAM and ROM), EPROM, EEPROM, flash cards, or any memory common to computer platforms. Further, memory 24 may include one or more flash memory, cells, or may be any secondary or tertiary storage device, such as magnetic media, optical media, tape, or soft, or hard disk.

Further, computer platform 20 also includes a processor 22, which may be an application-specific integrated circuit ("ASIC"), or other chipset, logic circuit, or other data processing device. Processor 22 such as ASIC may execute an application programming interface ("API") layer 50 that interfaces with any resident programs, such as contact matching module 36, stored in the memory 24 of wireless communication device 10. API 50 is typically a runtime environment executing on the respective wireless device. One such runtime environment is Binary Runtime Environment for Wireless® (BREW®) software platform developed by Qualcomm, Inc., of San Diego, CA. Other runtime environments may be utilized that, for example, operate to control the execution of applications on wireless computing devices.

Processor 22 may include various processing subsystems 52 embodied in hardware, firmware, software, and combinations thereof, that enable the functionality of communication device 10 and the operability of the communication device on wireless network 16. For example, processing subsystems 52 allow for initiating and maintaining communications, and exchanging data, with other networked devices. In aspects in which the wireless communication device is defined as a cellular telephone the communications processor 22 may additionally include one or a combination of processing subsystems 52, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 52 of processor 22 may include any subsystem components that interact with contact-matching module 36 on computer platform 20.

Computer platform 30 may further include communications module 26 embodied in hardware, firmware, software, and combinations thereof that enables communications among the various components of the wireless communication device 10, as well as between the communication device 10, wireless network 16 and other communication devices, such as wireless communication device 12. In described aspects, the communication module 26 enables the communication of all correspondence between the first communication device 10, the second communication device 12 and wireless network 16. The communication module 54 may include the requisite hardware, firmware, software and/or combinations thereof for establishing a wireless or wired network communication connection.

Communications module 26 is operable to receive a dial string for initiating/originating, a wireless communication call and a dial string for connecting/terminating a communication call. The communication module 26 may include dialer module 28 operable for receiving a call originating dial string 30 for initiating/originating a wireless call and a call-receiving module 32 operable for receiving a call connecting dial string 34 from wireless network 16 for connecting/terminating a communication call. In alternate aspects, dialer module 28 and call-receiving module 32 may be embodied in one comprehensive module capable of receiving a call originating dial string 30 for placing a wireless call and for receiving a call connecting dial string 34 from wireless network 16.

Memory 24 includes a contact-matching module 36 operable for attempting to match call originating dial string 30 and/or call connecting dial string 34 to one of a plurality of stored contact listings 38. Contact listings 38 may include a contact name, a number associated, with the contact and any other information associated with the contact. Contact listings 38 may be generated manually by the user of wireless communication device 10 or they may be electronically communicated or otherwise loaded on wireless communication devices 10. In most instances, a match between dial string 30 or 34 and one of the plurality of contact listings 38 may result in the visual display or audio communication of information related to the contact, such as the contact name, contact number and the like in conjunction with the placement of the call or the receipt of the call from network 16. In this regard, from the placed call perspective, the displayed or otherwise, communicated contact information allows the user to verify that they have dialed the correct number and that an attempt is being made to connect the call. From the received call perspective, the displayed or otherwise, communicated contact information provides for the identification of the caller at the call-receiving wireless communication device. Additionally, while the contact listings 38 are depicted as stored locally on wireless communication device 10, in alternate aspects the contacts may be stored remotely at a network device, which is accessible to wireless communication device 10 to search or retrieve contact information as needed.

The contact-matching module 36 may include call originating logic 40 operable for attempting to match the call-originating dial string 30 to one of the plurality of contact listings 38. In one aspect, the attempt to match the call originating dial string 30 to one of the plurality of contact listings 38 may include determining if the call originating dial string matches one of the plurality of contact listings 38 and, if no match is determined, changing the length of the dial string by adding or deleting a dialing code 44 associated with wireless communication device 10. An attempt may then be made to match the changed dial string to one of the plurality of contact listings 38. The process of changing the dial string length, by adding or deleting dialing codes 44, may continue iteratively until a contact match is determined or until all dialing codes 44 associated with wireless communication device 10 have been added or deleted from the dial string and no resulting contact match is determined. In many aspects adding or deleting a code occurs at the beginning of the dial string, however, it is also conceivable and within the inventive concepts herein disclosed to add or delete the code from within the dial string (i.e., insert) or at the end of the dial string (i.e., append). The dialing codes 44 may include, but are not limited to, an area code, a country code, a region code, a city code, a network code or the like.

The contact-matching module 36 may include call connecting logic 44 operable for attempting to match the call-connecting dial string 34 to one of the plurality of contact listings 38. In one aspect, the attempt to match the call connecting dial string 34 to one of the plurality of contact listings 38 may include determining if the call originating dial string matches one of the plurality of contact listings 38 and, if no match is determined, changing the length of the dial string by deleting any code found in the dial string. An attempt is then made to match the changed dial string to one of the plurality of contact listings 38. The process of changing the dial string length, by deleting a code, may continue iteratively until a contact match is determined, or until all the codes occurring in call-connecting dial string 34 have been deleted from the dial string and no resulting contact match is determined. The codes occurring within call connecting dial string 34 may include, but are not limited to, an area code, a country code, a region code, a city code, a network code or the like. In other aspects, the attempt to match the call connecting dial string 34 to one of the plurality of contact listings 38 may Include changing the length of the dial string by iteratively adding codes. In alternative aspects, call originating logic 40 and call connecting logic 44 may be comprehensively included in a single logic element capable of providing contact matching in both the call originating and call receiving situations.

Figure 3:
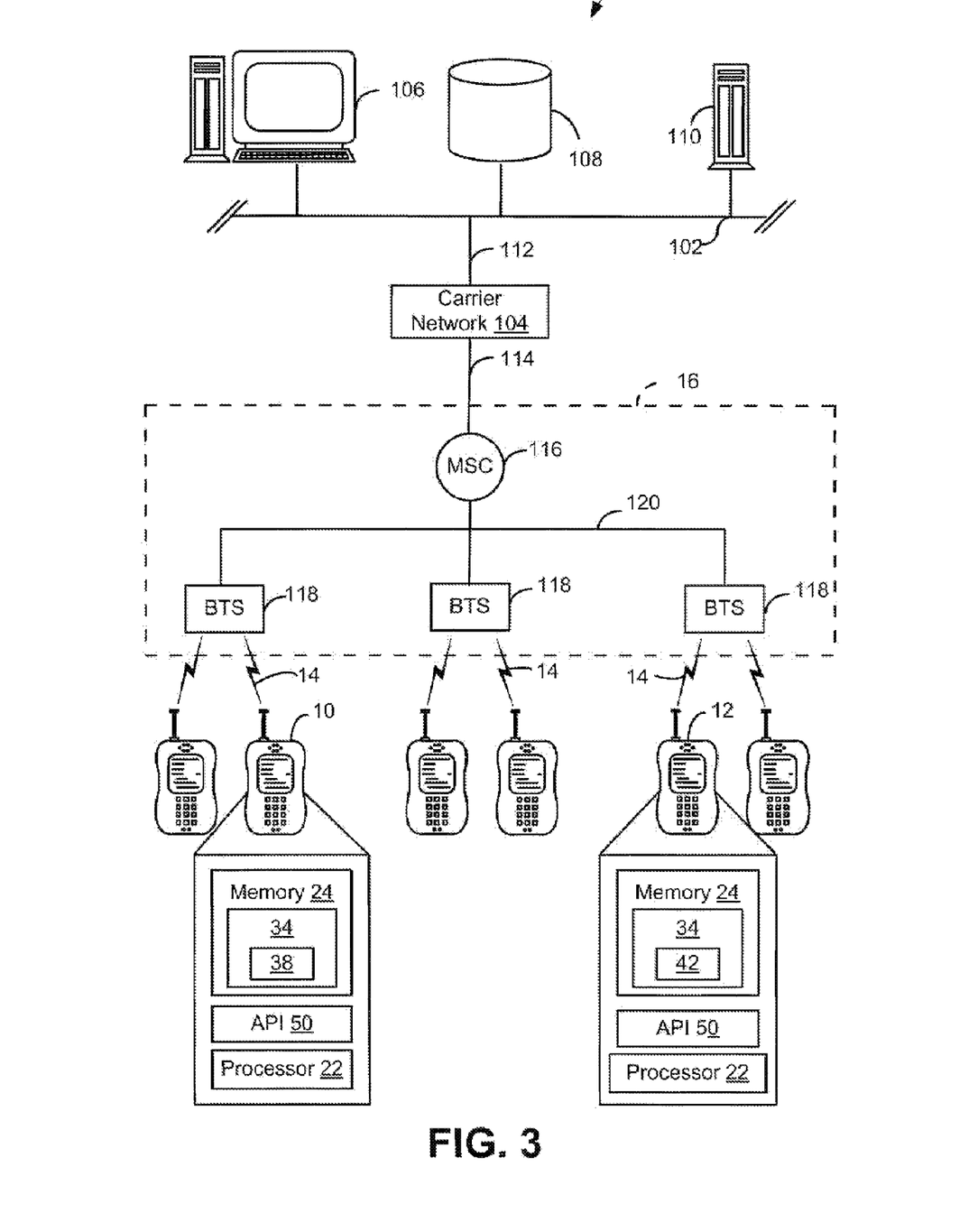
FIG. 3 Is a schematic representation of a wireless network communication system as implemented by the wireless communication device of the present aspects.
Figure 5:
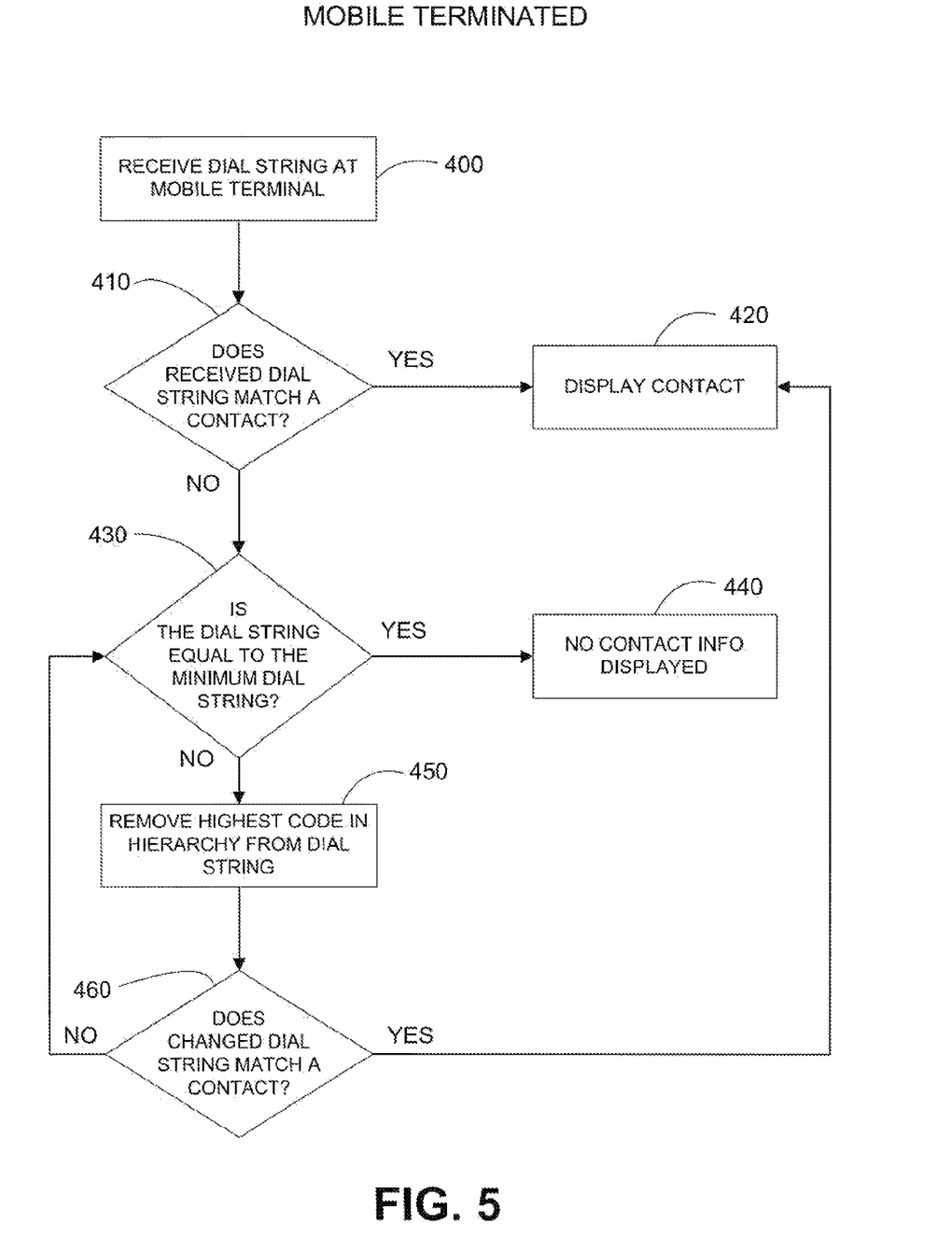
FIG. 5 is a flow diagram of a method for call connecting dial string to contact matching, in accordance with an aspect.

Referring to FIG. 3, in one aspect, wireless devices 10 and 12 comprise a cellular telephone. A cellular telephone system 100 may include wireless network 16 connected to a wired network 102 via a carrier network 104. Wireless devices 10 and 12 are being manufactured with increased computing capabilities and often can communicate packets including voice and data over wireless network 16. As described earlier, these "smart" wireless devices 10 and 12 have APIs 50 resident on their local computer platform 20 that allow software developers to create software applications that operate on the cellular telephone 10 and 12, and control certain functionality on the device. FIG. 5 is a representative diagram that more fully illustrates the components of a cellular wireless network and the interrelation of the elements of one aspect of the present system. Cellular wireless network 16 is merely exemplary and can include any system whereby remote modules, such as wireless devices 10 and 12 communicate over-the-air between and among each other and/or between and among components of a wireless network 16, including, without limitation, wireless network carriers and/or servers.

In system 100, network server 106 can be in communication over a wired network 102 (e.g. a local area network, LAN) with a separate data repository 108 for storing contact listing, dialing codes or the like. Further, a data management server 110 may be in communication with network server 14 to provide post-processing capabilities, data flow control, etc. Network server 14, data repository 108 and data management server 110 may be present on the cellular telephone system 100 with any other network components that are needed to provide cellular telecommunication services. Network server 106, and/or data management server 108 communicate with carrier network 104 through a data links 112 and 114, which may be data links such as the internet, a secure LAN, WAN, or other network. Carrier network 104 controls messages (generally being data packets) sent to a mobile switching center ("MSC") 116. Further, carrier network 104 communicates with MSG 116 by a network 114, such as the Internet, and/or POTS ("plain old telephone service"). Typically, in network 114, a network or Internet portion transfers data, and the POTS portion transfers voice information. MSC 116 may be connected to multiple base stations ("BTS") 118 by another network 120, such as a data network and/or Internet portion for data transfer and a POTS portion for voice information. BIS 118 ultimately broadcasts messages wirelessly to the wireless devices, such as wireless devices 10 and 12, by short messaging service ("SMS"), or other over-the-air methods.

Figure 4:
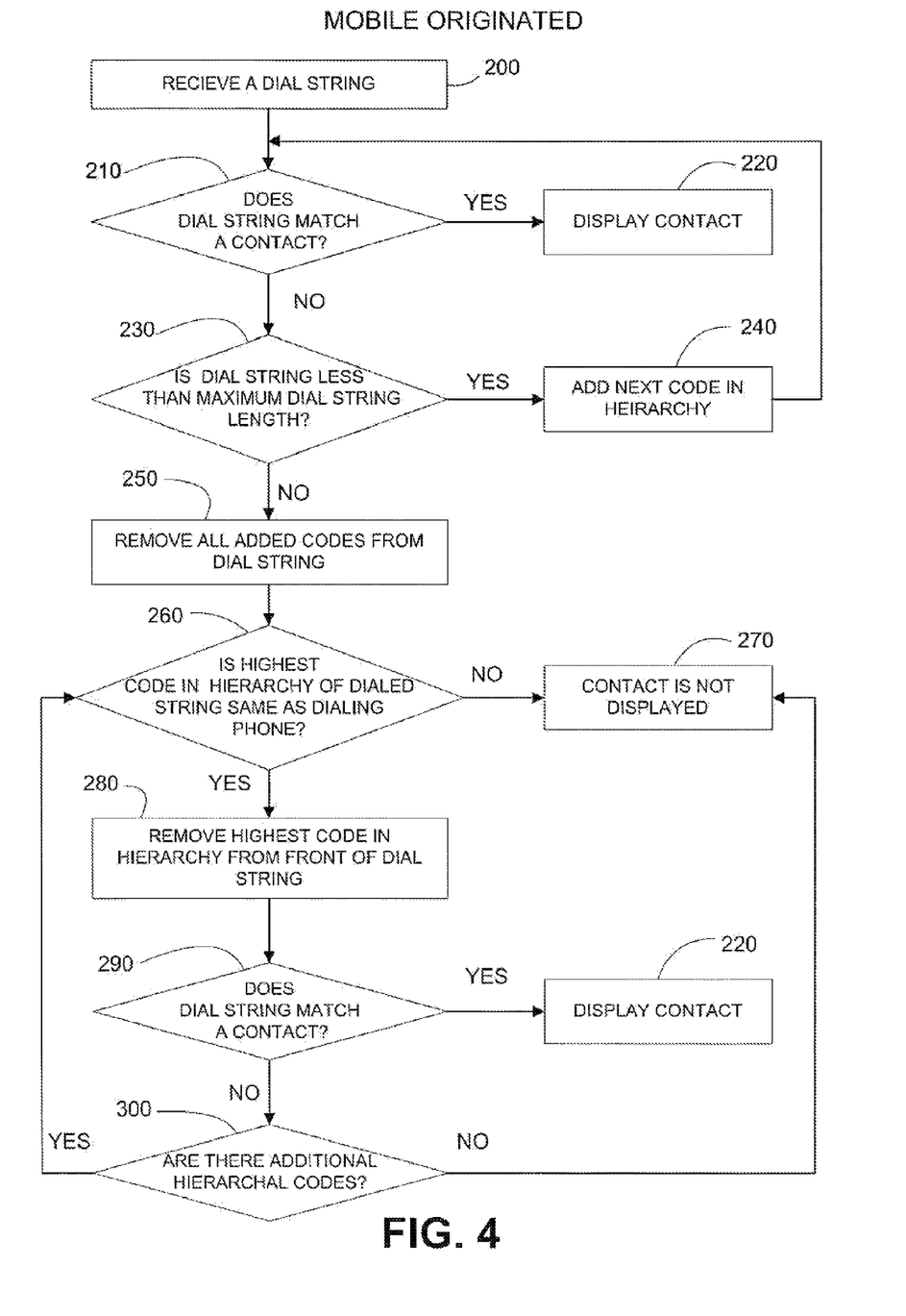
FIG. 4 is a flow diagram of a method for call initiating dial string to contact matching, in accordance with an aspect.

Referring to FIG. 4, shown is a flow diagram of a method for call originating dial string to contact matching in a wireless communication device, according to one specific aspect. At Event 200, the wireless communication device receives a dial string for initiating a wireless communication call. The received dial string may be manually inputted by the user of the wireless communication device or automatically generated by the device or a module that is executed on the device. The dial string may include any series of digits that are associated with the device that is being called. For example, the dial string may include the called device's telephone number (in the United States this is a seven digit number) and in addition one or more of an area code, a country code, a region code, a city code, a network code or the like.

At Event 210, an attempt is made to match the received dial string to one of the plurality of stored contact listings/numbers. In some aspects, the match constitutes an exact match between the received dial string and one of the plurality of stored contact numbers. In other aspects, a match may constitute the matching of the last x number of digits in the dial string, for example, the last seven digits in the dial string, to one of the plurality of stored contacts. If a match is determined then, at Event 220, the contact information is displayed or otherwise communicated to the user of the wireless communication device. The displayed information may include, but is not limited to, the contact's stored number or a portion of the stored number, the name of the contact, and any other information associated with the contact that is stored in the contact listing.

If the initial determination provides for no match then, at Event 230, a determination is made as to whether the length of the dial string is less than the maximum dial string length (i.e., the length of the dial string if applicable codes are attached to the string). If the dial string length is less than the maximum dial string length then, at Event 240, the next code in the hierarchy of codes associated with the wireless communication device that is placing the call is added to the dial string. Each wireless communication device may have one or more codes associated with the device, such as the area code, the country code, the region code, the city code, the network code and the like. The code will topically be added to the dial string by prefixing the code to the beginning of the dial string, although in alternate aspects, the code may be inserted within the dial string or appended to the end of the dial string. For example, in one aspect, the received dial string is a seven-digit telephone number and the first code in the hierarchy is the area code, which is then prefixed to the beginning of the dial string. The process then returns to Event 210, where an attempt is made to match the changed dial string to one of the plurality of stored contact listing/number. If a match is determined then, at Event 220, the contact information is displayed or otherwise communicated to the user of the wireless communication device. If the determination provides for no match then, at Event 230, a determination is made as to whether the length, of the changed dial string is less than the maximum dial string length. As long as no match has been determined and the changed dial string is less than the maximum dial string length the process will iteratively continue to add the next code in the code hierarchy to the dial string and determine if a match exists.

Once a determination is made that the dial string length has reached the maximum dial string length then, at Event 250, all codes that were added to the dial string are removed and, at Event 260, a determination is made as to whether the highest code in the hierarchy of codes included in the received dial string is associated with the wireless communication device that is placing the call. In some aspects, the highest code in the hierarchy of codes will be the first code at the beginning of the dial string, while in other aspects the highest code in the hierarchy of codes may be found elsewhere in the dial String. For example, if the dial string includes a country code and an area code, the country code may be deemed the highest code in the hierarchy of codes and a determination is made to whether the country code in the dial string Is equivalent to the country code of the wireless communication device that is placing the call. If the highest code in the hierarchy of codes is not associated with the wireless communication device (i.e., the code in the dial string differs from the wireless communication device code) then, at Event 270, no contact is displayed and the contact matching process terminates.

If the highest code in the hierarchy of codes is associated with the wireless communication device (i.e., the code in the dial string is equivalent to the wireless communication device code) then, at Event 280, the highest code in the hierarchy of codes is removed from the dial string and, at Event 290, a determination is made as to whether the changed dial string matches one of the plurality of stored contact numbers. If a match is determined then, at Event 220, the contact information is displayed or otherwise communicated to the user of the wireless communication device. If the determination provides for no match then, at Event 300, a determination is made as to whether further hierarchal codes are present in the received dial string. If no additional hierarchal codes exist in the received dial string then, at Event 270, no contact is displayed and the contact matching process terminates.

If additional hierarchal codes are present on the dial string then, the process returns to Event 260, for a determination as to whether the next highest code in the hierarchy of codes included in the received dial string is associated with the wireless communication device that is placing the call. If the next highest code in the hierarchy of codes is not associated with the wireless communication device (i.e., the code in the dial string differs from the wireless communication device code) then, at Event 270, no contact is displayed and the contact matching process terminates. If the next highest code in the hierarchy of codes is associated with the wireless communication device (i.e., the code in the dial string is equivalent to the wireless communication device code) then, at Event 280, the highest code in the hierarchy of codes is removed from the dial string and, at Event 290, a determination is made as to whether, the changed dial string matches one of the plurality of stored contact numbers. If a match is determined then, at Event 220, the contact information is displayed, or otherwise communicated to the user of the wireless communication device. If the determination provides for no match then, at Event 300, a determination is made as to whether further hierarchal codes are present In the received dial string. This iterative process continues until no further hierarchal codes are present in the dial string.

Referring to FIG. 5, shown is a flow diagram of a method for call connecting dial string to contact matching in a wireless communication device, according to one specific aspect. At Event 400, the wireless communication device receives a dial string for a wireless network for connecting a wireless communication call. The dial string may include any series of digits that are associated with the device that is placing the call. For example, for calls originating and terminating in the United States the dial string that is received from the network includes the area code and telephone number in the dial string, regardless of whether the call originating device included the area code in the dial string. In other call situations, the dial string received from the wireless network may additionally include other codes, such as a country code, a region code, a city code, a network code or the like.

At Event 410, an attempt is made to match the received dial string to one of the plurality of stored contact listing/number. In some aspects, the match constitutes an exact match between the received dial string and one of the plurality of stored contact numbers. In other aspects, a match may constitute the matching of the last "x" number of digits in the dial string, for example, the last seven digits in the dial string, to one of the plurality of stored contacts. If a match is determined then, at Event 420, the contact information is displayed or otherwise communicated to the user of the wireless communication device. The displayed information may include, but is not limited to, the contact's stored number or a portion of the stored number, the name of the contact, and any other information associated with the contact that is stored in the contact listing. If the initial determination provides for no match then, at Event 430, a determination is made as to whether the length of the dial string is equal to the minimum dial string length (i.e., the length of the dial string if no codes are attached to the string).

If the dial string length is equal to the minimum dial strength length then, at Event 440, no contact information is displayed or otherwise communicated and the contact matching process is terminated. If the dial string length is greater than the minimum dial string length then, at Event 450, the highest code in the hierarchy of codes included in the received dial string is removed and, at Event 460, a determination is made as to whether the changed dial string matches one of the plurality of stored contact numbers. If a match is determined then, at Event 420, the contact information is displayed or otherwise communicated to the user of the wireless communication device.

If the determination provides for no match then, the process returns to Event 430, a determination is made as to whether the length of the changed dial string is equal to the minimum dial string length. If the changed dial string length is equal to the minimum dial strength length then, at Event 440, no contact information is displayed or otherwise communicated and the contact matching process is terminated. If the changed dial string length is greater than the minimum dial string length then, at Event 450, the next highest code in the hierarchy of codes included in the received dial string is removed and, at Event 460, a determination is made as to whether the changed dial string matches one of the plurality of the stored contact numbers. This iterative contact matching process continues until the changed dial string matches a contact and a contact is displayed or the changed dial string is determined to equal the minimum dial string length, in which case no contact information is displayed.

Figure 6:
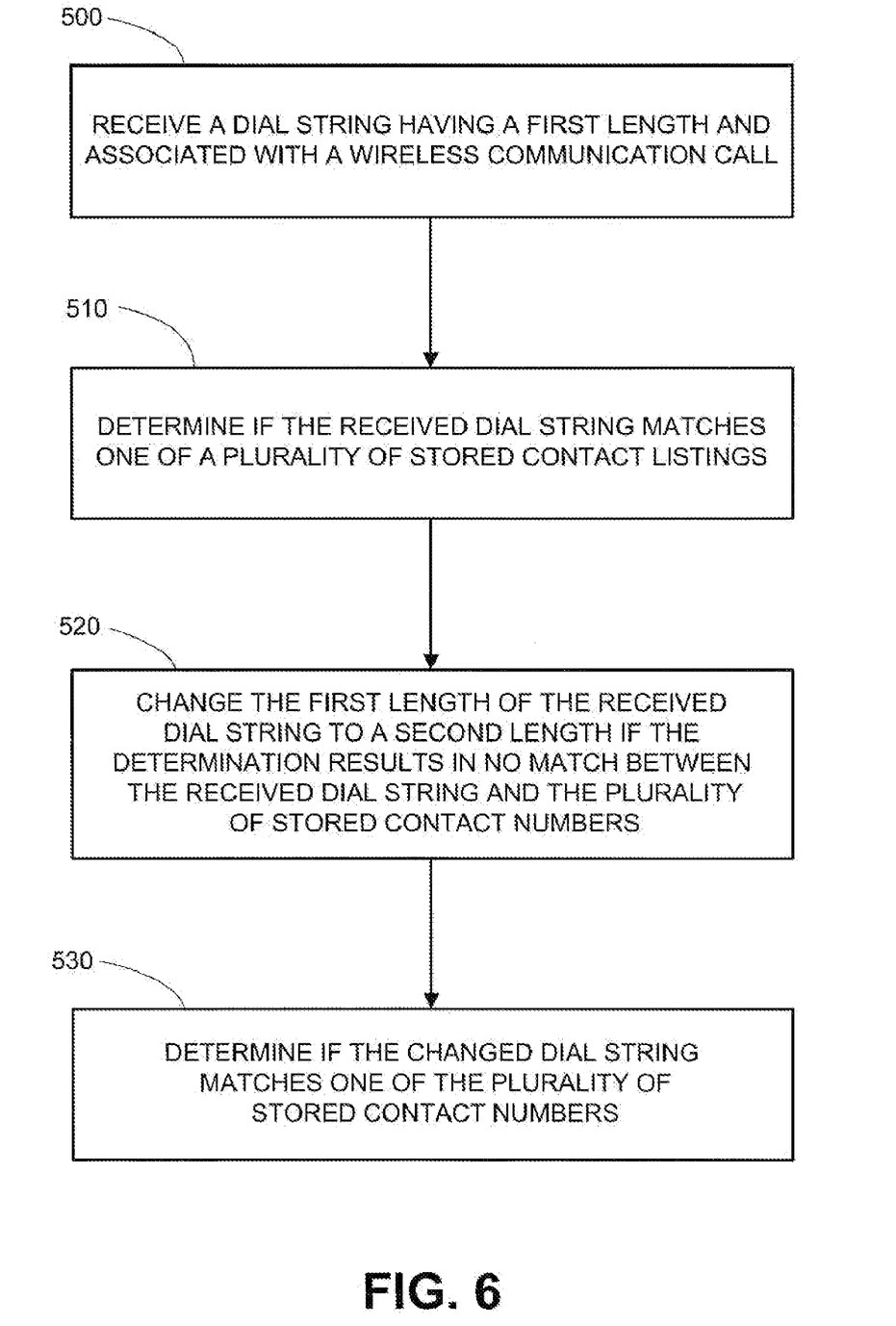
FIG. 6 is a flow diagram of a method for dial string to contact matching at a wireless communication device, in accordance with an aspect.

Referring to FIG. 6, a flow diagram of a method for dial string to contact matching is provided. At Event 500, a wireless communication device receives a dial string that has a first length and is associated with a wireless communication call. The dial string may be the initial dial string entered at a wireless communication device to place a wireless call or the dial string may be the dial string received from a wireless network by a wireless communication device to connect a wireless call. The dial string may include digits corresponding to the number of the calling device or the device receiving the call, as well as, codes that are associated with the calling device or the device receiving the call. Examples of codes that may be included in the dial string include, but are not limited to, an area code, a country code, a region code, a city code, a network code and the like.

At Event 510, the wireless communication device determines if the received dial string matches one of the plurality of stored contact listings/numbers. In some aspects, me determined match is an exact match between the dial string and the contact numbers and, in other aspects, the determined match may be a match of the last x number of digits in the dial string and a contact number. If a match exists, information related to the contact may be displayed or otherwise communicated via the wireless communication device.

If the determination results in no match occurring between the received dial string and the contact numbers the, at Event 520, the received dial string is changed from the first length to a second length. Changing the length of the dial string may entail adding to a code, or deleting a code from, the dial string. In those aspects in which the received dial string is the initial dial string associated with the device that is being called, changing the dial string may involve adding or deleting a code to or from the dial string that is associated with the device that is placing the call. In those aspects in which the received dial string is the dial string received from the network by a wireless device that is connecting a call, changing the dial string may involve deleting a code from the received dial string.

At Event 530, the wireless device determines if the changed dial string matches one of the stored contact numbers. If a match exists, information related to the contact may be displayed or otherwise communicated via the wireless communication device. If a match does not exist, the process may continue iteratively until all possible codes have been added to the dial string and/or all possible codes have been removed from the dial string and the associated match process either results in a no match or no match is determined.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine-readable medium and/or computer readable medium. Further, in some aspects, the steps and/or actions of a method or algorithm may reside as a computer program product including a computer readable medium having one or any combination or set of codes for causing a computer to perform the steps and/or actions.

Thus, present aspects define a robust contact-matching scheme that provides for matching and subsequent display of contact information to occur in most instances in which a connection occurs and for no matching and subsequent display of contact information to occur in most instances in which a connection does not occur. In this regard the described aspects, systems and apparatus overcome problems related to an exact match scheme, which fails to provide contact information in many instances in which a call, connection occurs, and a last seven or any other number digit match scheme, which may provide contact information in instances in which a call connection cannot be made or is made to an unintended device.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for contact matching at a wireless communication device, the method comprising:
    receiving a dial string associated with a wireless communication call, wherein the dial string comprises a first length;
    determining if the received dial string matches one of a plurality of stored contact numbers;
    changing the first length of the received dial string to a second length if the determination results in no match between the received dial string and the plurality of stored contact numbers; and
    determining if the changed dial string matches one of the plurality of stored contact numbers.

2. The method of claim 1, wherein receiving a dial string further comprises receiving a dial string for initiating a wireless communication call, wherein the dial string comprises a first length.

3. The method of claim 2, wherein changing the first length of the received dial string further comprises adding, to the received dial string, a code associated with the wireless communication device.

4. The method of claim 3, wherein adding, to the received dial string, a code associated with the wireless device further defines adding as chosen from the group consisting of prefixing, inserting and appending.

5. The method of claim 3, wherein adding, to the received dial string, a code associated with the wireless device further defines the code as a first code in a dialing hierarchy that includes one or more codes.

6. The method of claim 5, further comprising adding to the changed dial string a next code in the dialing hierarchy if no match results between the changed dial string and the plurality of stored contact numbers until a match is found or it is determined no match exists.

7. The method of claim 3, wherein adding, to the received dial string, a code associated with the wireless communication device further defines the code as chosen from the group consisting of an area code, a country code, a region code, a city code and a network code.

8. The method of claim 2, wherein changing the first length of the received dial string further comprises deleting, from the received dial string, a code if the determination results in no match between the received dial string and the plurality of stored contact numbers and if the code is associated with the wireless communication device.

9. The method of claim 8, wherein deleting, from the received dial string, a code associated with the wireless device further defines deleting as chosen from, the group consisting of deleting a prefix, deleting an insert and deleting an appendix.

10. The method of claim 8, wherein deleting, from the received dial string, a code associated with the wireless device further defines the code as a first code in a dialing hierarchy that includes one or more codes.

11. The method of claim 10, further comprising deleting from the changed dial string, a next code in the dialing hierarchy if no match results between the changed dial string and the plurality of stored contact numbers until a match is found or it is determined no match exists.

12. The method of claim 8, wherein deleting, from the received dial string, a code associated with the wireless communication device farther defines the code as chosen from the group consisting of an area code, a country code, a region code, a city code and a network code.

13. The method of claim 1, wherein determining if the received dial string matches one of a plurality of stored contact numbers further comprises determining if the received dial string exactly matches one of a plurality of stored contact numbers.

14. The method of claim 1, wherein determining if the received dial string matches one of a plurality of stored contact numbers further comprises determining if a last predetermined number of digits in the received dial string matches the last predetermined number of digits in one of a plurality of stored contact numbers.

15. The method of claim 1, wherein receiving a dial string further comprises receiving a dial string for connecting a wireless communication call, wherein the dial string comprises a first length.

16. The method of claim 15, wherein changing the first length of the received dial string further comprises deleting, from the received dial string, a code if the determination results in no match between the received dial string and the plurality of stored contact numbers.

17. The method of claim 16, wherein deleting, from the received dial string, a code associated with the wireless device further defines deleting as chosen from the group consisting of deleting a prefix, deleting an insert and deleting an appendix.

18. The method of claim 16, wherein deleting, from the received dial string, a code associated with the wireless device further defines the code as a first code in a dialing hierarchy that includes one of more codes.

19. The method of claim 18, further comprising deleting from the changed dial string, a next code in the dialing hierarchy if no match results between the changed dial string and the plurality of stored contact numbers until a match is found or it is determined no match exists.

20. The method of claim 16, wherein deleting, from the received dial string, a code associated with the wireless communication device further defines the code as chosen from the group consisting of an area code, a country code, a region code, a city code and a network code.

21. At least one processor configured to perform the actions of:
receiving a dial string associated with a wireless communication call, wherein the dial string comprises a first length;
determining if the received dial string matches one of a plurality of stored contact numbers;
changing the first length of the received dial string to a second length if the determination results in no match between the received dial string and the plurality of stored contact numbers; and
determining if the changed dial string matches one of the plurality of stored contact numbers.

22. A wireless communication device, comprising:
means for receiving a dial string associated with a wireless communication call, wherein the dial string comprises a first length;
means for determining if the received dial string matches one of a plurality of stored contact numbers;
means for changing the first length of the received dial string to a second length if the determination results in no match between the received dial string and the plurality of stored contact numbers; and
means for determining if the changed dial string matches one of the plurality of stored contact numbers.

23. A wireless communication device, comprising:
a computer platform including a processor;
a memory comprising a plurality of contact numbers;
a communication module in communication with the processor, wherein the communication module is operable for receiving a dial string of a first length associated with a wireless communication call; and
a contact matching module stored in the memory and executable by the processor, wherein the contact matching module is operable to determine if the dial string matches one of the plurality of contact numbers, wherein the contact matching module is operable to change the first length of the dial string to a second length if the determination results in no match between the dial string and the plurality of contact numbers, and wherein the contact matching module is operable to determine if the changed dial string matches one of the plurality of contact numbers.

24. The wireless communication device of claim 23, wherein the communication module further comprises a dialer module operable for receiving the dial string of a first length to initiate the wireless communication call.

25. The wireless communication, device of claim 24, wherein the contact matching module operable for changing the first length of the dial string to a second length if the determination results in no match between the dial string and the plurality of contact numbers further defines changing the first length as adding, to the dial string, a code associated with the wireless communication device.

26. The wireless communication device, of claim 25, wherein the contact matching module operable for adding, to the dial string, a code associated with the wireless communication device further defines adding as chosen from the group consisting of prefixing, inserting and appending.

27. The wireless communication device of claim 25, wherein the contact matching module operable for adding, to the dial string, a code associated with the wireless communication device further defines the code as a first code in a dialing hierarchy that includes one or more codes associated with the wireless communication device.

28. The wireless communication device of claim 27, wherein the contact matching module is operable for adding to the changed dial string, a next code in the dialing hierarchy if no match results between the changed dial string and the plurality of stored contact numbers until a match is found or it is determined no match exists.

29. The wireless communication device of claim 25, wherein the contact matching module operable for adding, to the dial string, a code associated with the wireless communication device further defines the code as chosen from the group consisting of an area code, a country code, a region code, a city code and a network code.

30. The wireless communication device claim 24, wherein the contact matching module operable for changing the first length of the dial string to a second length if the determination results In no match between the dial string and the plurality of contact numbers further defines changing the first length as deleting, from the dial string, a code if the determination results in no match between the received dial string and the plurality of contact numbers and if the code is associated with the wireless communication device.

31. The wireless communication device of claim 30, wherein the contact matching module operable for deleting, from the dial string, a code associated with the wireless device further defines deleting as chosen from the group consisting of deleting a prefix, deleting an insert and deleting an appendix.

32. The wireless communication device of claim 30, wherein the contact matching module operable for deleting, from the dial string, a code associated with the wireless device further defines the code as a first code in a dialing hierarchy that includes one or more codes.

33. The wireless communication device of claim 30, wherein the contact matching module is further operable for deleting, from the changed dial string, a next code in the dialing hierarchy if no match results between the changed dial string and the plurality of stored contact numbers until a match is found or it determined no match exists.

34. The wireless communication device of claim 23, wherein the contact matching module operable for determining if the dial string matches one of a plurality of contact numbers further comprises determining if the received dial string exactly matches one of a plurality of stored contact numbers.

35. The wireless communication device of claim 23, wherein the contact matching module operable for determining if the dial string matches one of a plurality of contact numbers further comprises determining if a last predetermined number of digits in the received dial string matches the last predetermined number of digits in one of the plurality of contact numbers.

36. The wireless communication device of claim 23, wherein the communications module further comprises a call-receiving module operable for receiving the dial string of a first length to connect a wireless communication call.

37. The wireless communication device of claim 36, wherein the contact matching module is further operable for determining if the dial string matches one of the plurality of contact numbers, changing the first length of the dial string to a second length if the determination results in no match between the dial string and the plurality of contact numbers and determining if the changed dial string matches one of the plurality of contact numbers.

38. The wireless communication device of claim 36, wherein the contact matching module operable for changing the first length of the dial string further defines changing the first length as deleting, from the dial string, a code if the determination results in no match between the received dial string and the plurality of contact numbers.

39. The wireless communication device of claim 38, wherein the contact matching module operable for deleting, from the dial string, a code further defines deleting as chosen from the group consisting of deleting a prefix, deleting an insert and deleting an appendix.

40. The wireless communication device of claim 38, wherein the contact matching module operable for deleting, from the dial string, a code associated with the wireless device further defines the code as a first code in a dialing hierarchy that includes one or more codes.

41. The wireless communication device of claim 40, wherein the contact matching module is further operable for deleting from the changed dial string, a next code in the dialing hierarchy if no match results between, the changed dial string and the plurality of stored contact numbers until a match is found or it determined no match exists.

42. The wireless communication device of claim 38, wherein the contact matching module operable for deleting, from the dial string, a code associated with the wireless communication device further defines the code as chosen from the group consisting of an area code, a country code, a region code, a city code and a network code.

* * * * *

UNITED STATES PATENT AND TRADEMARK OFFICE
CERTIFICATE OF CORRECTION

PATENT NO. : 7,616,969 B2  Page 1 of 1
APPLICATION NO. : 11/615320
DATED : November 10, 2009
INVENTOR(S) : Gatti It is certified that error appears in the above-identified patent and that said Letters Patent is hereby corrected as shown below:

Column 16, line 31, claim 12: "farther" to read as --further--

Column 17, line 53, claim 25: "communication, device" to read as --communication device--

Column 18, line 19, claim 30: "results In" to read as --results in--

Column 18, line 41, claim 33: "it determined" to read as --it is determined--

Column 20, line 6, claim 41: "between, the" to read as --between the--

Column 20, line 8, claim 41: "it determined" to read as --it is determined--

Signed and Sealed this
Fourteenth Day of June, 2011

David J. Kappos
*Director of the United States Patent and Trademark Office*